United States Patent [19]

Kluger et al.

[11] 4,182,439
[45] Jan. 8, 1980

[54] TORQUE MEMBER FOR A DRUM BRAKE

[75] Inventors: Michael A. Kluger, South Bend; James J. Colpaert, Granger, both of Ind.

[73] Assignee: The Bendix Corporation, Southfield, Mich.

[21] Appl. No.: 879,846

[22] Filed: Feb. 22, 1978

[51] Int. Cl.² ............................................. F16D 65/09
[52] U.S. Cl. ................................ 188/335; 188/205 A; 188/340; 188/364; 192/75; 192/115
[58] Field of Search .................. 188/78, 205 A, 205 R, 188/206 R, 331, 335, 340, 341, 362, 363, 364; 192/75, 115, 76

[56] References Cited

U.S. PATENT DOCUMENTS

| | | | |
|---|---|---|---|
| 1,098,808 | 6/1914 | Kiesel, Jr. | 188/206 R |
| 2,038,213 | 4/1936 | Frank | 188/331 X |
| 2,322,121 | 6/1943 | Frank | 188/364 |
| 2,325,944 | 8/1943 | Frank | 188/331 |
| 2,429,815 | 10/1947 | House | 188/206 R X |
| 2,828,834 | 4/1958 | Smith | 188/363 X |
| 3,085,660 | 4/1963 | Darling | 188/78 |
| 3,136,390 | 6/1964 | Zukowski | 188/206 A |
| 3,292,745 | 12/1966 | Dombeck | 188/362 |
| 3,666,061 | 5/1972 | Nehr | 188/206 R |
| 3,788,432 | 1/1974 | Marti | 188/332 X |
| 3,795,292 | 3/1974 | Keller, Jr. | 188/340 |

FOREIGN PATENT DOCUMENTS 361995 10/1922 Fed. Rep. of Germany ............. 192/76
1475438 11/1969 Fed. Rep. of Germany ............ 188/331

Primary Examiner—George E. A. Halvosa
Attorney, Agent, or Firm—Paul David Schoenle; Ken C. Decker

[57] ABSTRACT

A drum brake assembly includes a torque member which supports a hydraulic actuator. The hydraulic actuator is engageable with a pair of brake shoes and is operable to move the pair of brake shoes into a braking position. The torque member comprises a central portion which attaches to an axle assembly and a plurality of arms extending radially outward from the central portion. In the preferred embodiment the plurality of arms cooperate with the central portion to substantially form a Y-shaped member. One of the arms substantially forms the hydraulic actuator to integrally form the latter with the one arm. The other arms are provided with slots to direct the movement of the pair of brake shoes and a resilient spring within the slots opposes axial movement of the pair of brake shoes.

1 Claim, 3 Drawing Figures

_TORQUE MEMBER FOR A DRUM BRAKE_

BACKGROUND OF THE INVENTION

In view of the need to increase vehicle efficiency, weight reduction is of utmost importance as a lighter vehicle will utilize less energy. As illustrated in U.S. Pat. No. 3,576,237 and U.S. patent application Ser. No. 793,581, now U.S. Pat. No. 4,102,442, various modifications to a drum brake backing plate are within the public knowledge to reduce the weight of the backing plate.

It is believed to be an advance in the state of the art, if a drum brake design provides a weight reduction and also simplifies the construction of the drum brake assembly.

SUMMARY OF THE INVENTION

The present invention relates to a drum brake assembly wherein a torque member or backing plate attaches to an axle assembly and supports a hydraulic actuator which urges a pair of brake shoes into a braking position. The torque member or backing plate includes a central portion for attachment to the axle assembly and a plurality of arms extend radially from the central portion. In paticular, one of the plurality of arms defines a bore to integrally form the hydraulic actuator with the one arm. The other arms form slots to receive a respective brake shoe, thereby directing the movement of the brake shoes.

In a preferred embodiment of the present invention, the torque member is Y-shaped and made of aluminum or magnesium, and the one arm includes an axial thickness which is larger than the other arms. Also, the slots on the other arms support a resilient member to yieldably oppose axial movement of the brake shoes relative to the backing plate or torque member. The central portion forms a recess in order to permit radial attachment of the torque member plate to the axle assembly as well as axial attachment.

DETAILED DESCRIPTION

Figure 1:
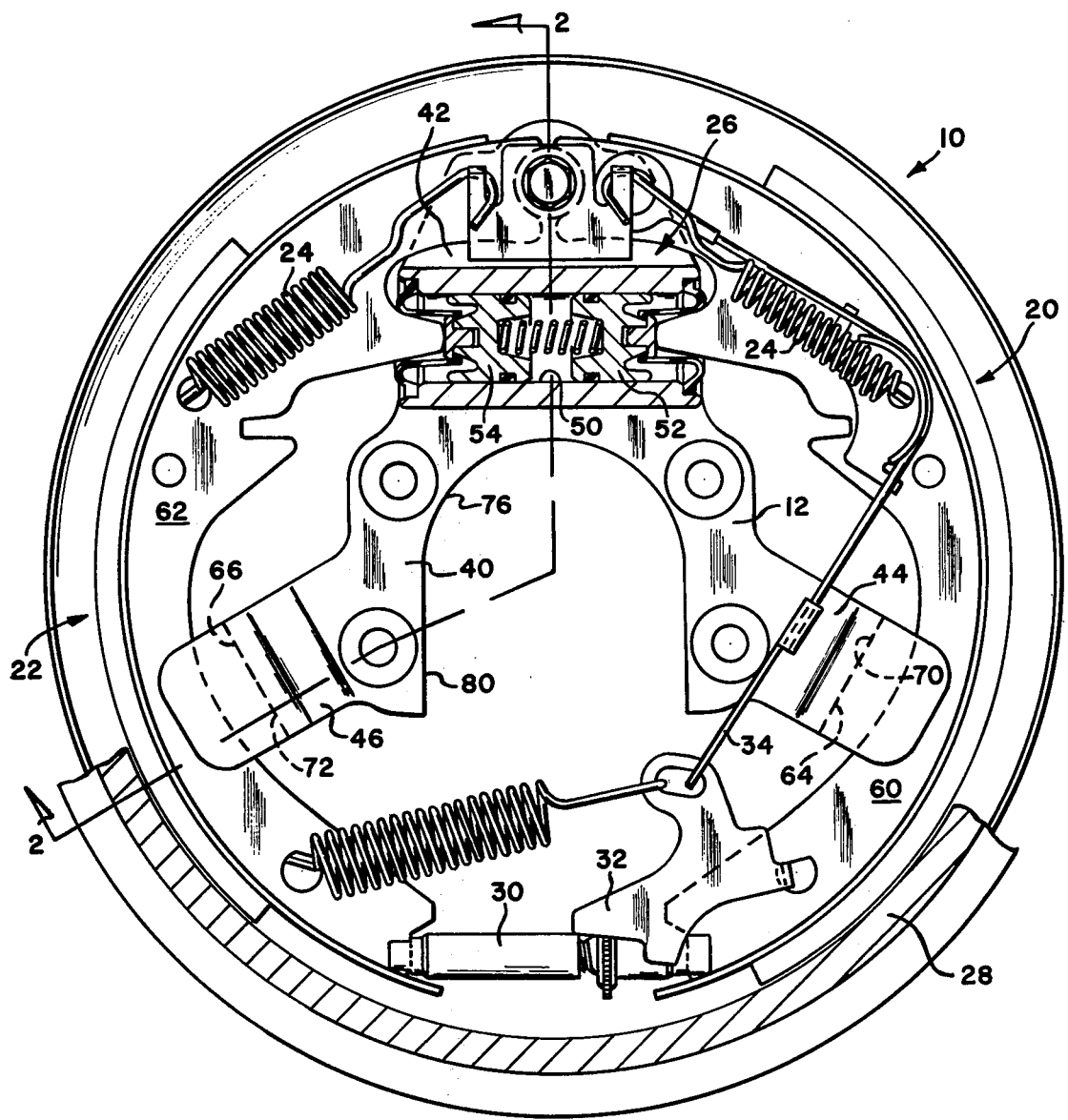
FIG. 1 is a front view of a drum brake assembly made according to the present invention.
Figure 2:
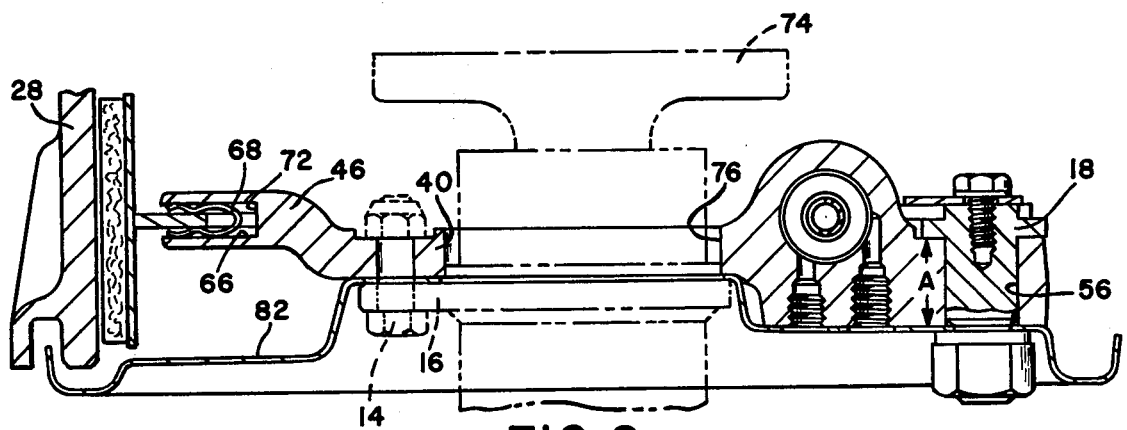
FIG. 2 is a cross-sectional view of FIG. 1 taken along line 2—2 in FIG. 1.
Figure 3:
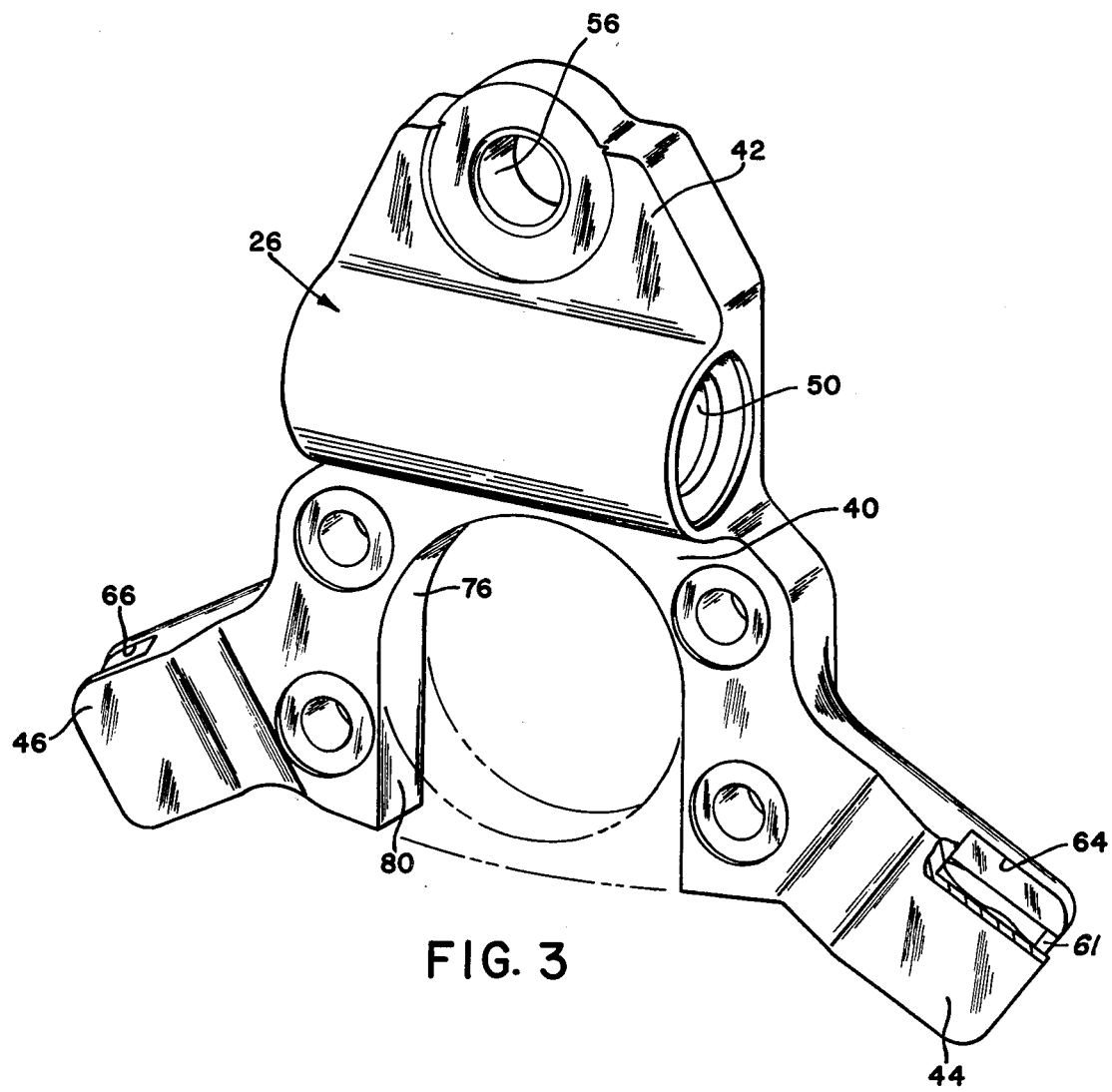
FIG. 3 is a perspective view of the torque member incorporated in the drum brake assembly of FIGS. 1 and 2.

In the drum brake assembly 10 illustrated in FIGS. 1-3, a torque member 12 is attached by any suitable means, such as bolts 14, to an axle assembly flange 16. The torque member 12 is provided with an anchor pin 18 for transferring brake torque from a pair of brake shoes 20 and 22 to the torque member. The anchor pin also supports the shoe guide plate which limits axial movement of the brake shoes. Retraction springs 24 resiliently urge the pair of brake shoes into engagement with the anchor pin 18.

A hydraulic actuator 26 engages the pair of brake shoes to move the latter to a braking position frictionally engaging the drum 28. An extendible member 30 cooperates with a pawl 32 and a cable 34 to provide for automatic adjustment of the pair of brake shoes relative to the drum 28 in a well-known manner.

In accordance with the invention, the torque member 12 is constructed of aluminum or magnesium to form a central portion 40 and a plurality of arms at 42, 44 and 46 which extend radially from the central portion 40. The first arm 42 is constructed with a bore 50 extending transversely to the radial extension of the first arm. The bore 50 receives a pair of pistons 52 and 54 to define the hydraulic actuator so that the hydraulic actuator is substantially integral with the first arm 42 of the torque member. The first arm is also provided with an opening 56 to receive the anchor pin 18. As the braking torque developed by the pair of brake shoes is transmitted to the anchor pin 18 and through the first arm 42 to the bolts 14, the first arm includes an axial thickness at A which is larger than the axial thickness of the arms 44 and 46.

The right brake shoe 20 and the left brake shoe 22 include webs 60 and 62 which are received in respective slots 64 and 66 on the second arm 44 and the third arm 46. Moreover, the slos 64 and 66 may be provided with grooves, such as shown at 61 in FIG. 3, to retain resilient spring clips 68 which are substantially U-shaped to also receive the brake shoe webs. The slots and spring clips cooperate with the shoe guide plate to resiliently oppose any axial movement by the brake shoes 20 and 22, thereby directing the radial expansion of the brake shoes into engagement with the drum. Viewing FIG. 1, the slots terminate in bottom walls 70 and 72 at a sufficient depth for the clips to remain spaced from the brake shoe webs so that various types of brake shoes with different radial web dimensions can be used with the torque member 12.

Turning to FIG. 2, an axle shaft is shown in phantom at 74. Generally, this shaft is larger in diameter at its end than the opening 76 in the central portion 40 so that the axle shaft must be removed before the torque member can be attached to the axle assembly. However, the present invention provides a recess at 80 on the central portion 40 circumferentially between the second arm 44 and the third arm 46, thereby permitting radial attachment of the torque member to the axle assembly when the shaft 16 is installed in the axle assembly. If the axle shaft is separated from the axle assembly, it is possible to axially or radially attach the torque member to the flange 16.

In order to protect the brake shoes and hydraulic actuator from dust and other contaminants, a dust shield 82 is secured between the flange 16 and the central portion 40. When the torque member is being radially installed or removed, it is necessary to disconnect the dust shield from the torque member.

The drum brake assembly 10 operates in a conventional manner such that pressurized fluid communicated to the hydraulic actuator moves the pistons 52 and 54 outward thereby urging the pair of brake shoes into frictional engagement with the rotating drum to effectuate braking. During radial expansion of the pair of brake shoes and when the latter contact the drum, the spring clips 68 and slots 64 and 66 limit axial movement of the brake shoes to provide for uniform engagement between the brake shoes and the drum.

Viewing FIG. 3, it is seen that the torque member is substantially Y-shaped (although upside down) with the first arm 42 integrally incorporating the hydraulic actuator 26. The second and third arms form slots to receive the brake shoes and the recess 80 permits easy attachment of the torque member to an axle assemb˙·. With the torque member being constructed in a Y- or spider shape, a substantial amount of unnecessary material is eliminated; however, the operation of the drum brake is not compromised as the slots direct radial expansion of the brake shoes and the thickness of the first arm provides sufficient strength to take the torque developed during braking.

FIG. 3 also shows a portion of the torque member in phantom. This phantom portion encloses the opening 76 so that only axial installation is possible if the recess 80 is eliminated.

Many variations of the present invention are possible by those skilled in the art and it is intended that these variations are included within the scope of the appended claims.

We claim:

1. In a drum brake assembly having a torque member and a pair of brake shoes movable to a braking position by a hydraulic actuator, the torque member having a central section and a plurality of arm portions extending radially from the central section, one of the plurality of arm portions supportiing the hydraulic actuator and the remaining arm portions cooperating with the pair of brake shoes to direct the movement of the pair of brake shoes to the braking position, the improvement wherein each remaining arm portion defines a slot, and a substantially U-shaped spring clip is disposed within each slot, each of said U-shaped spring clips receiving a respective brake shoe to resiliently resist movement of each respective brake shoe in both axial directions and said slots form grooves receiving said spring clips to retain the latter within each of said slots.

* * * * *